(12) United States Patent
Brastauskas et al.

(10) Patent No.: US 7,621,108 B1
(45) Date of Patent: Nov. 24, 2009

(54) ASSEMBLING A PACKAGED BUNDLE USING AN ADJUSTABLE MULTI-SHELVED PRODUCT TRANSPORTER

(75) Inventors: James Peter Brastauskas, Mason, OH (US); Peter Vasilios Boumis, Mason, OH (US); William Russel Clem, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 12/481,926

(22) Filed: Jun. 10, 2009

(30) Foreign Application Priority Data

Jul. 18, 2008 (CA) .................................... 2634695

(51) Int. Cl.
B65B 35/30 (2006.01)
(52) U.S. Cl. .............................. 53/445; 53/443; 53/154
(58) Field of Classification Search ........... 53/443–447, 53/154
See application file for complete search history.

(56) References Cited

U.S. PATENT DOCUMENTS

| | | | |
|---|---|---|---|
| 2,630,951 A * | 3/1953 | Slightam | ..................... 53/448 |
| 3,247,981 A | 4/1966 | Johnson | |
| 3,295,290 A | 1/1967 | Selby | |
| 3,309,835 A | 3/1967 | Peppler | |
| 3,362,128 A | 1/1968 | James | |
| 3,493,106 A | 2/1970 | Galli | |
| 3,756,395 A | 9/1973 | Ganz | |
| 3,756,397 A | 9/1973 | Ganz | |
| 3,878,943 A | 4/1975 | Ryan | |
| 4,081,126 A | 3/1978 | Barnard | |
| 4,216,640 A | 8/1980 | Kaurman | |
| 4,222,478 A | 9/1980 | Gasser | |
| 4,283,903 A | 8/1981 | Mayhall | |
| 4,669,611 A | 6/1987 | Flaherty | |
| 4,827,114 A | 5/1989 | Blachon | |
| 4,895,255 A | 1/1990 | Fisher | |
| 5,056,294 A | 10/1991 | Focke | |
| 5,105,600 A | 4/1992 | DePoint, Jr. | |
| 5,109,650 A | 5/1992 | Hogenkamp | |
| 5,211,528 A | 5/1993 | Kato | |
| 5,328,319 A * | 7/1994 | Fadaie | ................... 414/416.01 |
| 5,359,830 A | 11/1994 | Olson | |
| 5,372,472 A | 12/1994 | Winski | |
| 5,385,438 A * | 1/1995 | Fadaie | ........................ 414/810 |
| 5,396,752 A | 3/1995 | Mastropasqua | |
| 5,406,770 A | 4/1995 | Fikacek | |
| 5,412,923 A * | 5/1995 | Lashyro et al. | ................. 53/399 |
| 5,430,992 A * | 7/1995 | Olson | .......................... 53/399 |
| 5,439,106 A | 8/1995 | Focke | |
| 5,492,222 A | 2/1996 | Weaver | |
| 5,553,442 A * | 9/1996 | Fadaie | .......................... 53/445 |
| 5,636,966 A | 6/1997 | Lyon | |
| 5,758,471 A | 6/1998 | Denley et al. | |
| 5,765,336 A | 6/1998 | Neagle | |
| 5,787,679 A | 8/1998 | Lynch | |
| 5,992,630 A | 11/1999 | Brown | |
| 5,996,316 A | 12/1999 | Kirschner | |
| 6,050,399 A | 4/2000 | Pratt | |
| 6,058,679 A | 5/2000 | Ziegler | |

(Continued)

Primary Examiner—Hemant M Desai
(74) Attorney, Agent, or Firm—David V. Upite

(57) ABSTRACT

The use of a multi-shelved product transporter for transporting products, diverted from manufacturing lines, to a downstream packaging area is a cost effective way of assembling a packaged bundle of products.

22 Claims, 4 Drawing Sheets

U.S. PATENT DOCUMENTS

| | | |
|---|---|---|
| 6,213,293 B1 | 4/2001 | Marco |
| 6,293,393 B1 | 9/2001 | Clay |
| 6,423,226 B1 | 7/2002 | Hopkins et al. |
| 6,626,632 B2 | 9/2003 | Guenzi |
| 6,658,813 B2 | 12/2003 | Clay |
| 6,729,836 B2 | 5/2004 | Stingel, III |
| 6,817,829 B2 | 11/2004 | Kameda |
| 6,871,116 B2 | 3/2005 | Brust |
| 6,877,294 B2 | 4/2005 | Hellmann |
| 6,880,313 B1 | 4/2005 | Gessford |
| 7,159,375 B2 | 1/2007 | Hellmann |
| 7,237,671 B2 | 7/2007 | Chambers |
| 7,584,592 B2 * | 9/2009 | Gabrielson et al. ............ 53/445 |
| 2004/0179924 A1 | 9/2004 | Lundahl |

* cited by examiner

ASSEMBLING A PACKAGED BUNDLE USING AN ADJUSTABLE MULTI-SHELVED PRODUCT TRANSPORTER

FIELD OF THE INVENTION

The invention is directed to assembling products.

BACKGROUND OF THE INVENTION

Today's manufacturing schemes for consumer products must run very efficiently and at high speed in order to economically enable the manufacturer to provide products to the market at competitive prices. This is particularly true for consumer goods such as packaged foods, cleaning products, and paper goods.

Operating at typical speeds, these manufacturing schemes can produce and package hundreds of items per minute. These individual product packages must then be configured in the packaging section of the manufacturing scheme into arrangements for desirable assortment as well as efficient and economical shipping to the marketplace. These shipping containers vary from sealed, corrugated cartons holding a predetermined number of individual packages to corrugated trays with poly wrapping to stretch-wrapped, multi-layer bundles designed to be placed on pallets.

Because of the need for high-speed operations, the typical limitation of an automated packaging operation is that it is designed to produce a very limited number of packaging arrangements. In order for a manufacturing line to have the flexibility to arrange product packages in multiple shipping arrangements, several, separate packing operations are required and must all be connected to the manufacturing line for efficient operations. A change in product package grouping (e.g. 12 bottles per carton to 4 bottles per carton) often requires a complicated, timely mechanical change to the packaging section which necessitates the manufacturing operation being stopped.

This manufacturing requirement for inflexible package groupings runs contrary to the increasing demands for product grouping flexibility from the marketplace. For instance, club stores often require products to be bundled into packets of two or more individual product packages. Likewise, special sales promotions may require that two similar or dissimilar products be bundled and shipped together for a limited period of time.

Currently, these special packing requirements are satisfied by costly, manual operations. As such, there is a need for an automated, highly-flexible packing operation which can quickly assemble special packing arrangements without disrupting ongoing manufacturing operations.

SUMMARY OF THE INVENTION

The present invention attempts to address these and other needs by providing, in one aspect of the invention, a method of assembling a packaged bundle of at least two products comprising the steps: diverting a first group of products from a manufacturing line to a diverted product site; loading the diverted first group of products from the diverted product area to a first shelf of a multi-shelved product transporter; diverting a second group of products from the manufacturing line to the diverted product area; adjusting the height of a second shelf of the multi-shelved product transporter for loading; loading the diverted second group of products from the diverted product area to the second shelf of the multi-shelved product transporter; transporting the multi-shelved product transporter loaded with products to a downstream packaging site; adjusting the height of the first shelf of the multi-shelved product transporter for product unloading; unloading the first group of products from the first shelf of the multi-shelved product transporter to the downstream packaging area; adjusting the height of the second shelf of the multi-shelved product transporter for product unloading; unloading the second group of products from the second shelf of the multi-shelved product transporter to the downstream packaging area; and packaging a packaged bundle of at least two products from the unloaded products.

Another aspect of the invention provides for a method of assembling a packaged bundle of at least a first product and a second product comprising the steps: diverting a first product from a first manufacturing line to a first diverted product site; grouping products of the diverted first product into at least a first group of first products and a second group of first products; loading the diverted first group of first products from the first diverted product site to a first shelf of a first multi-shelved product transporter; loading the diverted second group of first products from the first diverted product site to a second shelf of a first multi-shelved product transporter; diverting a second product from a second manufacturing line to a second diverted product site; grouping products of the diverted second product into a least a first group of second products and a second group of second products; loading the diverted first group of second products from the second diverted product site to a first shelf of a second multi-shelved product transporter; loading the diverted second group of second products from the second diverted product site to a second shelf of a second multi-shelved product transporter; transporting the first multi-shelved product transporter loaded with first products and the second multi-shelved product transporter loaded with second products to a downstream packaging area; unloading the first products from the first multi-shelved product transporter and the second products from the second multi-shelved product transporter to the downstream packaging site; and packaging the packaged bundle of at least two products from the unloaded products, wherein at least one product of the two products is a first product and at least another product of the two products is a second product.

DETAILED DESCRIPTION OF THE INVENTION

To meet this need for special packaging arrangements, the present invention seeks to inter alia create a packaging manufacturing operation that can be highly automated and can be quickly programmed to assemble special packing arrangements (e.g., so called "bundle packs.") The present invention seeks to accomplish this goal, preferably without much disruption to current manufacturing operations.

Product Diversion

A first aspect of the invention provides diverting product from main manufacturing lines. Products may be diverted from one or more manufacturing lines by those techniques known in the manufacturing arts. Product diversion, for example, may be accomplished by any number of well-known electromechanical or mechanical diverter schemes. The diverter may include a mechanism (either electrical or mechanical) to control the number of products being diverted versus those remaining on the main manufacturing line (e.g. 10% of total products made will be diverted).

These manufacturing lines may manufacture the same or different products. For example, a first manufacturing line may be dedicated to manufacturing a first product. A second manufacturing line may be dedicated to a second product, a third line to a third product, etc.

In turn, the diverted products may be delivered to a diverted product site by known techniques such as by conveyor or gravity feed.

Loading Product to Multi-Shelved Product Transporter

Another aspect of the invention provides for loading product to a multi-shelved product transporter. Products diverted from the manufacturing line arrive at the diverted product site. The diverted product site may receive products from one dedicated manufacturing line. Alternatively the diverted product site receives products from two or more manufacturing lines. A first manufacturing line manufactures a first product. A second manufacturing line manufactures a second product. Alternatively each manufacturing line (of a plurality of manufacturing lines) has a dedicated diverted product site. Products at the diverted product site are loaded onto a multi-shelved product transporter. Diverted products may be divided into groups to facilitate loading on to the shelves of the multi-shelved product transporter. For example, a single group of products may be dedicated to a single shelf of the multi-shelved product transporter. A single group of products can be further separated into a plurality of "sub-groups" wherein the sub-groups are loaded onto the single shelf in a series of steps.

Figure 1:
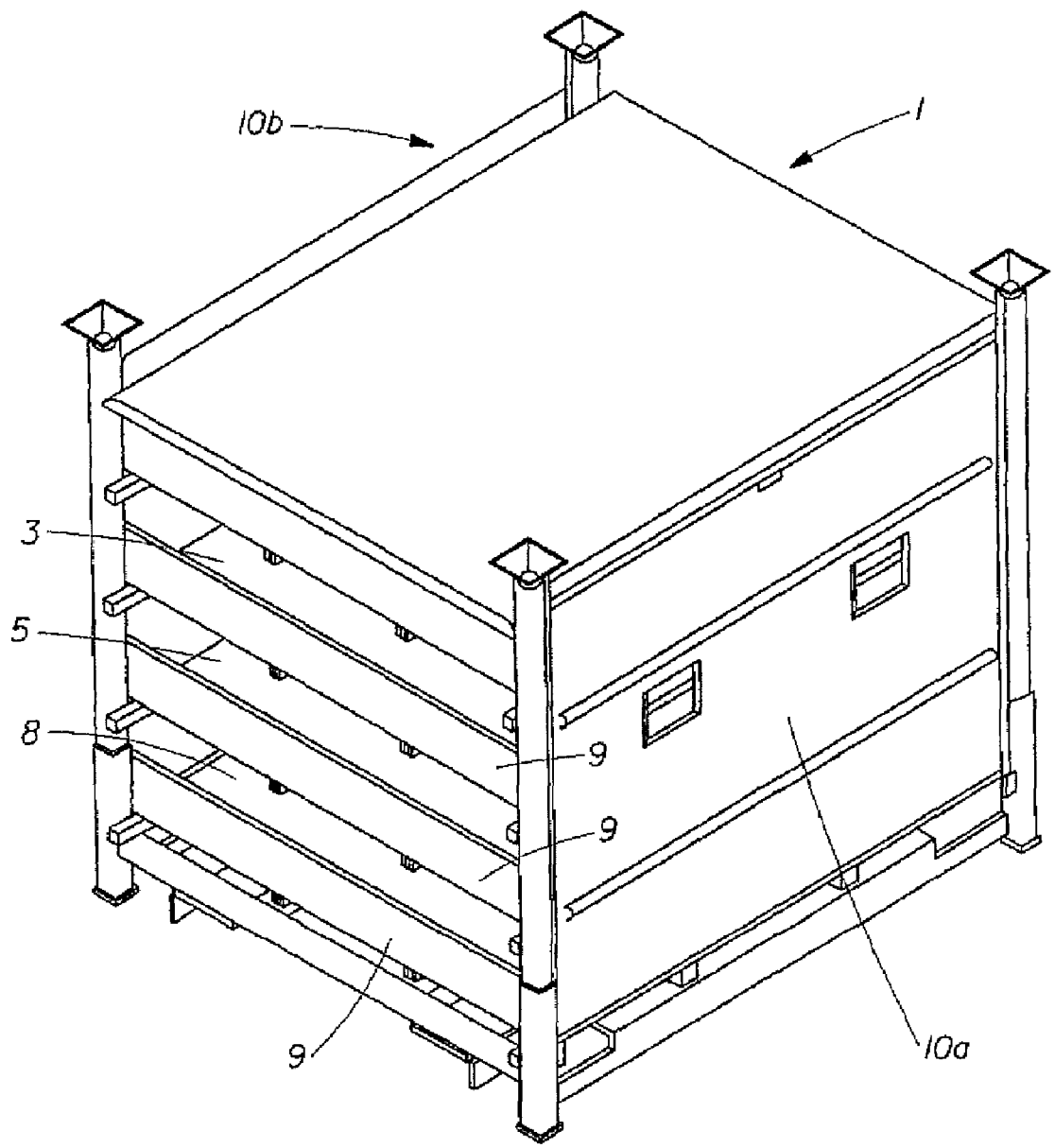
FIG. 1 is a multi-shelved product transporter.

FIG. 1 is an example of multi-shelved product transporter 1. The multi-shelved product transporter comprises at least a first shelf 3 and a second shelf 5 for shelving product (products not shown). Of course the transporter 1 may have a third shelf 8 or even more shelves depending upon the size of the products, application, and other considerations. The shelves 3, 5, 8 of the transporter are substantially horizontal, preferably horizontal (relative to the floor of the product manufacturing/assembly facility). The transporter may have one or more sliding panels 10a, 10b that may be raised vertically to expose the shelves during product loading/unloading. The sliding panel(s) 10a, 10b secure(s) loaded products while the transporter is transported. The transporter may also have walls 9a, 9b, 9c around each respective shelf. In one embodiment, the shelves of the transporter may have two walls and two sliding panels. The walls serve to position the products on the shelf during product loading and secure loaded product while the transporter is transported during product loading and secures loaded products while the transporter is transported. Although not shown in FIG. 1, the transporter 1 may have wheels to allow the transporter 1 to be mobile. Other embodiments may include loading the transporter 1 on to a forklift, pallet truck, pallet jack, automated guided vehicle, pallet conveyor, or such known devices (for transporting the transporter 1).

Figure 2:
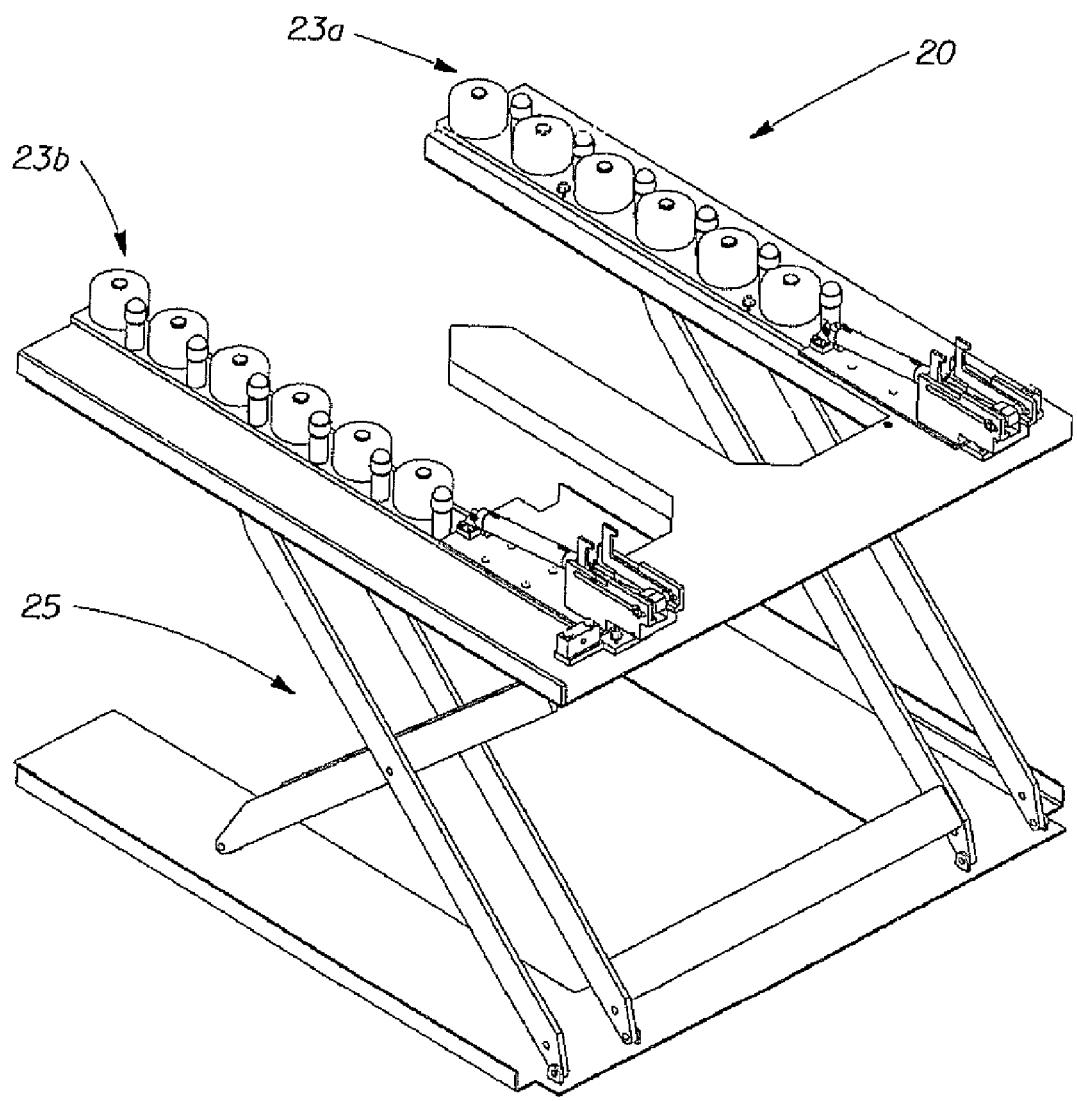
FIG. 2 is a lift for the multi-shelved product transporter of FIG. 1.

FIG. 2 is a lift 20 for the multi-shelved product transporter 1 of FIG. 1. The lift 1, may be a so called scissors lift having scissors elements 25. The scissors lift 20 may be elevated or lowered by pulling or pushing against the scissors elements 25 by the use of a screw, pneumatic bellows, or piston or other such known mechanism. The lift 20 may have rollers 23a, 23b on either side to guide the transporter of FIG. 1 (not shown) into position. The lift may be bolted or otherwise affixed to the floor. A first lift may be used in loading products and a second lift may be used in unloading products from the transporter (not shown in FIG. 2).

Figure 3:
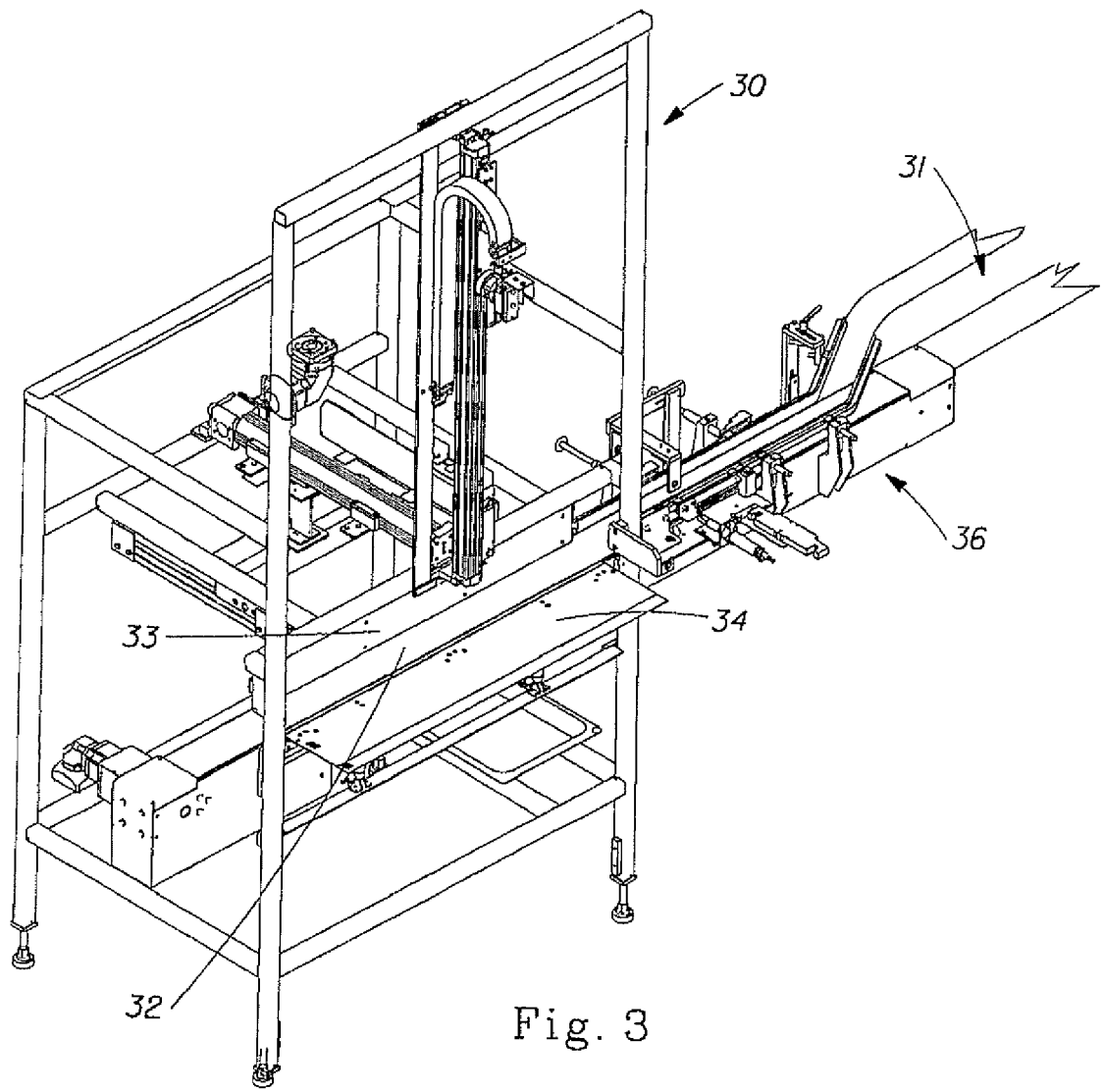
FIG. 3 is a diverted product area where products are loaded on to a shelf of a multi-shelved product transporter.

FIG. 3 is a diverted product site 30 where the products are loaded onto the shelf of the multi-shelved product transporter (not shown in FIG. 3). Products that are diverted from a manufacturing line (not shown) arrive by conveyor 31, typically in a single file, where the products are metered by a product meter 36 into product groups or product sub-groups. Products can be loaded on each shelf of the transporter on a product group-by-product group basis. Each group of products can be divided further into sub-groups. In turn, products can be loaded on to a single shelf on a sub-group-by-sub-group basis. Each group of products or sub-group of products is metered to have a designated number of products to maximize loading efficiency. For example, if products are loaded on a sub-group-by-sub-group basis, this number is based upon the collective width all the products of the sub-group together (in a single file line) aligning with the width of the shelf of the transporter. The number is preferably such that a single file line of product sub-group can be loaded on to the shelf (by the product loading pusher 33 (discussed infra)). With too many products, all the products of the sub-group may not fit on the shelf when loading. Of course it is possible that some products with simple and stable geometries may not require metering, and the shelf can be flood with product until filled. By not having enough products for product loading, the available space of the shelf for product loading may not be maximized. Although not shown, the sliding panel (nearest the products to be loaded) of the multi-shelved product transporter is raised to expose shelves for product loading.

Still referring to FIG. 3, once the optimized number of products of the sub-group are metered and arrive at a product loading area 32, a first spanning gate 34 is lowered to span the product loading area 32 to the first shelf of the multi-shelved product transporter. In a preferred embodiment, the top surface of the shelf of the transporter and the top surface of product loading area 32 are abutted such that the gap (not shown) between the two surfaces is minimized and that the two surfaces are at about same height relative to each other (i.e., about level to one another). It is the spanning gate 34 that helps to align the metered products in the product loading area and spans the gap during product loading (from the product loading area to the shelf of the transporter).

The first spanning gate 34, when in a substantially horizontal position, aligns products in a single file. The substantially horizontal position of the gate 34 also prevents the gate 34 from obstructing the transporter from being elevated or lowered by the lift. The spanning gate 34 is lowered to a substantially non-horizontal position to span the product loading area 32 to the shelf of the transporter. The second spanning gate 45 is in the substantially non-horizontal position to prevent obstruction of the transporter while being elevated or lowered by the lift. Products are loaded from the diverted product area 32 across the spanning gate 34 to the shelf. In FIG. 3, the gate 34 is shown in a substantially horizontal position. The spanning gate 34 may be attached by hinge (not shown), where the hinge is placed at or near the horizontal top surface of the product loading area. The hinge acts as the point of flexion for the gate 34. The raising and lowering of the spanning gate 34 may be done by an actuator such as a pneumatic cylinder, rotary cam, or a linear or rotary servo drive, and other known means. In one embodiment, the spanning gate 34 acts as a "draw bridge" spanning the gap (between the top horizontal surface of the shelf and the top horizontal surface of the product loading area 32).

Still referring to FIG. 3, a first sub-group (of the first group of products) is loaded to the first shelf of the transporter across the first spanning gate 34 by being pushed by a product loading pusher 33. The product loading pusher 33 may be a simple pneumatic piston mechanical cam pusher, or linear servo controlled drive or any other known means. As each subsequent sub-group (i.e., the second sub-group, the third sub-group etc.) is loaded onto the first shelf, it pushes the previously loaded sub-group. This process is repeated until all the products of a group, i.e., all sub-groups of the first group, are loaded on to the shelf. Once the first shelf is loaded (preferably with enough products to maximize the space available on a shelf), the first spanning gate is raised from a substantially horizontal position to a substantially non-horizontal position.

Once the first spanning gate 34 is raised and the second shelf is positioned for loading, the second group of products (or the first sub-group of the second group of products) align in the product loading area to repeat the process for product loading on the transporter. The process can be repeated with third, fourth, etc. groups of products until the respective third, fourth, etc. shelves of the transporter are loaded with product. The process is completed once the multi-shelved product transporter is loaded with products and is ready to transport the products. The loaded transporter is dismounted from the lift and then is ready to transport the products to the downstream packaging area. A second multi-product transporter can thereafter be mounted on the lift to repeat the process of product loading. Having two or more multi-shelved product transporters maximizes the efficiency in the operation (e.g., since a first transporter may be loading product while a second is unloading product).

Transporting the Transporter

Once the multi-shelved product transporter is loaded with product, that transporter is transported to a downstream packaging site. In one embodiment, the transporter may comprise wheels (not shown) to enable a worker to transport the transporter from one site of the manufacturing facility to another site. Of course robots, automated guide vehicles, pallet jacks, forklifts, etc. as well as other methods may be used for transporting the transporter.

Unloading Product to Downstream Packaging Site

Figure 4:
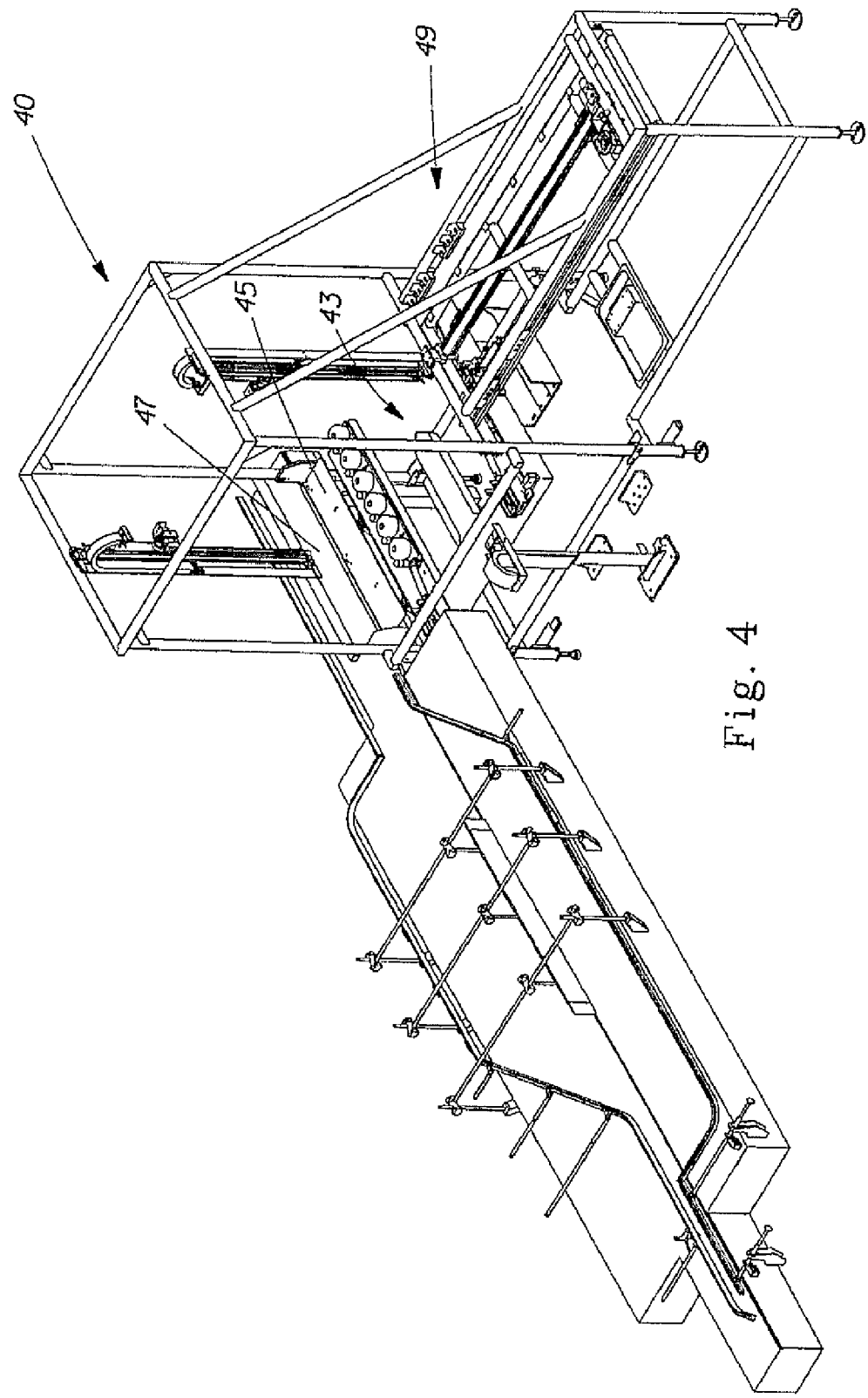
FIG. 4 is a downstream packaging area where products are unloaded from the multi-shelved product transporter.

FIG. 4 is a downstream packaging site 40 where products (not shown) are unloaded from the multi-shelved product transporter (not shown). The transporter to the downstream packaging site 40 may be mounted onto a second lift 43 for the transporter. The sliding panels (not shown) on either side of the product transporter may be raised to allow access to the products shelved on the shelves of the transporter. The second lift 43 may raise or lower the transporter thereby adjusting the height of the shelves for product unloading. In one embodiment, the top surface of the second shelf of the transporter and the top surface of the product unloading area 47 of the downstream packaging area 40 are abutted such that the gap (not shown) between the two top surfaces is minimized and are at about same height relative to each other (i.e., about level to each other). Products are unloaded from the shelf of the transporter across the second spanning gate 45 to the product unloading area 47. In FIG. 4, the gate 45 is shown in a substantially horizontal position. The spanning gate 45 may be attached by hinge (not shown), where the hinged is placed at or near the horizontal top surface of the product loading area. The hinge acts as the point of flexion for the gate 45. The raising and lowering of the spanning gate 45 may be done by an actuator such as a pneumatic cylinder, rotary cam, or a linear or rotary servo drive, and other known means. In one embodiment, the spanning gate 45 acts as a "draw bridge" spanning the gap (between the top horizontal surface of the shelf and the top horizontal surface of the product unloading area 47).

Still referring to FIG. 4, once the height of the second shelf is at the appropriate height, a second spanning gate 45 is lowered from a substantially horizontal position to a substantially non-horizontal position to span the gap during product unloading. A product unloading pusher 49 pushes products from the shelf of the transporter across the gate 45 to the product unloading area 47. The pusher 49 is on the side opposite of the gate 45 such that the products nearest the gate are generally unloaded before the products nearest the pusher 49. The product unloading pusher 49 may use a linear servo drive, a mechanical drive that creates a liner motion, or pneumatic cylinder depending on the level of control required. This pusher may be controlled to continuously discharge products from the shelf, or use intermittent motion to create groups of product when discharged. Of course other known means may be used to unload the products from the shelves. Once the products of the second shelf are unloaded, the second spanning gate 45 returns back to a substantially non-horizontal position from the horizontal position (to prevent obstruction of the transporter when being elevated or lowered by the second lift 43). The lift 43 raises or lowers the transporter to expose the next shelf for product unloading. The aforementioned process is again repeated and yet again repeated for each of the subsequent shelves of the transporter until all the products are unloaded. Once unloaded, the sliding panel(s) of the transporter are lowered, the lift 43 lowers the transporter to floor level, and the unloaded transporter is transported back to the diverted product site to once again have products loaded thereon.

Once the products are unloaded from the multi-shelved product transporter, the transporter may be returned to the diverted product site to repeat the process (i.e., to once again be loaded with diverted products).

Packaged Bundles of Product

Once product is unloaded from the multi-shelved product transporter, products can be packaged in a bundle of at least two products. The term "packaged bundles" is used broadly to include a broad range of packaged product combinations—for retail sale and/or shipping.

For example, robots and other automation devices are positioned to take the products and arrange them into the desired configurations. For instance, the desired arrangement may be two bottles of product bundled together with heat shrink film. This bundle may require that one bottle faces "out" (front label facing out so the consumer can read it) and one bottle facing "in" (so that the back label with ingredients or nutritional information can be read by the consumer). An alternate configuration may require that the two bottles have a label sleeve placed over them or around them to present the package graphics but alternate UPC code. The robot can configure the bottles into pairs with appropriate facings and place the pair on a conveyor where they are oriented in a shrink wrap sleeve. The products are then run through a heat tunnel to shrink the film and bind the products together. Yet another alternative of products arrangement could be a bottle and a box.

As an additional step, the bundled product may require a separate label (such as a UPC label or retailer specific labeling) to meet the retailer's merchandising requirements. This label can be automatically attached to the bundle once the shrink wrap cools.

A similar arrangement could be established for dissimilar products. Dissimilar products could also be automatically handled using a second, third, etc, unloading device mentioned above. The robots would again orient the products into groupings and the groupings are bundled together by whatever means desired (heat shrink, adhesive, bands, etc.) Leaflets and other promotional literature can be introduced automatically or manually as well.

Another variation for this operation could be the assembly of mixed products for display on trays. The products are collated by the robots and prepared for such assembly Case/Tray Packing Once the products have been oriented in the desired bundles, they can be conveyed to a case/tray packing area. In this area, the shipping containers are assembled (in the case of cartons) and filled with bundled products. Robots are in position and programmed to grab the bundles and place them in cartons or on pallets or display trays. As the cartons are filled, they are sealed and conveyed to the pallet loader for pallet load construction and stretch wrapping.

In the case of display tray packing, the trays are filled, one level at a time, and new trays are introduced to the "stack" until a unit load is completed. This operation takes place on a pallet so the "stack" and the pallet are integral. Again, robots are utilized to arrange the product on the display trays and to introduce new trays to the "stack." Once the products are packed and palleted, the pallets are moved to the warehouse for transportation to the market.

Standard manufacturing logistical software (such as those available from SAP, and Oracle) can be used to coordinate the aforementioned steps.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of assembling a packaged bundle of at least two products comprising the steps:
    a) diverting a first group of products from a manufacturing line to a diverted product site;
    b) loading the diverted first group of products from the diverted product site to a first shelf of a multi-shelved product transporter;
    c) diverting a second group of products from the manufacturing line to the diverted product site;
    d) adjusting the height of a second shelf of the multi-shelved product transporter for loading;
    e) loading the diverted second group of products from the diverted product site to the second shelf of the multi-shelved product transporter;
    f) transporting the multi-shelved product transporter loaded with products to a downstream packaging site;
    g) adjusting the height of the first shelf of the multi-shelved product transporter for product unloading;
    h) unloading the first group of products from the first shelf of the multi-shelved product transporter to the downstream packaging site;
    i) adjusting the height of the second shelf of the multi-shelved product transporter for product unloading;
    j) unloading the second group of products from the second shelf of the multi-shelved product transporter to the downstream packaging site;
    k) packaging a packaged bundle of at least two products from the unloaded products.

2. The method of claim 1,
    wherein the manufacturing line comprises a first manufacturing line and a second manufacturing line, wherein the first manufacturing line manufactures a first product and the second manufacturing line manufactures a second product;
    wherein the diverted product site comprises a first diverted product site and a second diverted product, site, wherein the first diverted product site, is dedicated to receiving products diverted from the first manufacturing line but not the second manufacturing line, and wherein the second diverted product site is dedicated to receiving products diverted from the second manufacturing line but not the first manufacturing line;
    wherein the multi-shelved product transporter comprises a first multi-shelved product transporter and a second multi-shelved product transporter, wherein the first multi-shelved product transporter is dedicated to transporting first products from the first diverted product site to the downstream packaging site; and wherein the second multi-shelved product transporter is dedicated to transporting second products from second diverted product site to the downstream packaging site.

3. The method of claim 1, wherein the adjusting the height of the first shelf and the second shelf of the multi-shelved product transporter during product loading comprising using a first lift for the transporter at the diverted product site.

4. The method of claim 3, wherein the adjusting the height of the first shelf and the second shelf of the multi-shelved product transporter during product unloading comprising using a second lift for the transporter at the downstream packaging site.

5. The method of claim 1, further comprising the step of spanning the diverted product loading site to the first shelf of the multi-shelved product transporter with a first spanning gate, wherein the spanning gate comprises a hinge that is placed at diverted product loading site, wherein the first group of products loaded on to said first shelf is loaded from the diverted product loading site across the spanning gate to said first shelf.

6. The method of claim 5, wherein the step of spanning the diverted product loading site and the first shelf of the multi-shelved product transporter with a first spanning gate further comprises lowering the first spanning gate from a substantially non-horizontal position to a substantially horizontal position.

7. The method of claim 6, further comprising the steps: (i) raising the first spanning gate from a substantially horizontal position to a non-horizontal position after the first group of products are loaded to the first shelf; and (ii) adjusting the height of the second shelf of the multi-shelved product transporter for loading the second group of products to the second shelf from the diverted product loading site.

8. The method of claim 7, further comprising the steps: (i) lowering the first spanning gate from the substantially non-horizontal position to the horizontal position; and (ii) loading the second group of product on to the second shelf of the multi-shelved product transporter.

9. The method of claim 5, comprising the step of spanning the downstream packaging site and the first shelf of the multi-shelved product transporter with a second spanning gate, wherein the first group of products loaded on to the first shelf is unloaded from the first shelf across the spanning gate to the downstream packaging site.

10. The method of claim 9, wherein the first group of products comprise containers containing liquid.

11. The method of claim 9, wherein the first group of products comprise a card board box boxing over-the-counter medicine.

12. The method of claim 1, comprising the step of spanning the downstream packaging site and the first shelf of the multi-shelved product transporter with a second spanning gate,
    wherein the spanning gate comprises a hinge that is placed at the downstream packaging site;
    wherein the first group of products loaded on to the first shelf is unloaded from the first shelf across the spanning gate to the downstream packaging site.

13. The method of claim 12, wherein the step of spanning the downstream packaging site and the first shelf of the multi-shelved product transporter with a second spanning gate further comprises lowering the second spanning gate from a substantially non-horizontal position to a substantially horizontal position.

14. The method of claim 1, wherein products of the first group of products and the second group of products are from the same single manufacturing line.

15. The method of claim 1, wherein the packaged bundle of at least two products comprises the first product and the second product shrink wrapped together suitable for retail sale.

16. The method of claim 15, wherein the first product is a bottle comprising liquid and the second product is a box boxing a pill, a tablet, or a capsule.

17. The method of claim 1, wherein the transporter comprises wheels to enable the transporter to be transported to said downstream packaging site.

18. The method of claim 1, further comprising the step of vertically raising a sliding panel to expose the first shelf of the multi-shelved product transporter before loading the diverted first group of products to the first shelf.

19. A method of assembling a packaged bundle of at least a first product and a second product comprising the steps:
    a) diverting a first product from a first manufacturing line to a first diverted product site;
    b) grouping products of the diverted first product into at least a first group of first products and a second group of first products;
    c) loading the diverted first group of first products from the first diverted product site to a first shelf of a first multi-shelved product transporter;
    d) loading the diverted second group of first products from the first diverted product site to a second shelf of the first multi-shelved product transporter;
    e) diverting a second product from a second manufacturing line to a second diverted product site;
    f) grouping products of the diverted second products into at least a first group of second products and a second group of second products;
    g) loading the diverted first group of second products from the second diverted product site to a first shelf of a second multi-shelved product transporter;
    h) loading the diverted second group of second products from the second diverted product site to a second shelf of the second multi-shelved product transporter;
    i) transporting the first multi-shelved product transporter loaded with first products and the second multi-shelved product transporter loaded with second products to a downstream packaging site;
    j) unloading the first products from the first multi-shelved product transporter and the second products from the second multi-shelved product transporter to the downstream packaging site;
    k) packaging the packaged bundle of at least two products from the unloaded products, wherein at least one product of the two products is a first product and at least another product of the two products is a second product.

20. The method of claim 19, wherein the diverted product site comprises a first diverted product site and a second diverted product site, wherein the first diverted product site is dedicated to receiving products from the first manufacturing line but not the second manufacturing line, and wherein the second diverted product site is dedicated to receiving products from the second manufacturing line but not the first manufacturing line.

21. The method of claim 19, wherein the first multi-shelved product transporter is dedicated to transporting product from the first manufacturing line or first diverted product site, but neither the second manufacturing line nor second diverted product site; and
    wherein the second multi-shelved product transporter is dedicated to transporting product from the second manufacturing line or second diverted product site, but neither the first manufacturing line nor first diverted product site.

22. The method of claim 19 further comprising the steps: (i) adjusting the height of the second shelf of first multi-shelved product transporter for loading the diverted second group of first products from the first diverted product site; and (ii) adjusting the height of the second shelf of the second multi-shelved product transporter for loading the diverted second group of second products from the second diverted product site.

* * * * *